United States Patent [19]
Tanaka et al.

[11] Patent Number: 5,655,881
[45] Date of Patent: Aug. 12, 1997

[54] FLUID TURBINE

[75] Inventors: Satoshi Tanaka, Daito; Atsushi Itoh, Shijyonawate; Shigehisa Katsuma, Nara, all of Japan

[73] Assignee: Exedy Corporation, Osaka, Japan

[21] Appl. No.: 612,995

[22] Filed: Mar. 8, 1996

[30] Foreign Application Priority Data

Mar. 17, 1995 [JP] Japan ................. 7-058865

[51] Int. Cl.$^6$ ........................................ F01D 5/22
[52] U.S. Cl. ........................ 416/180; 416/197 C
[58] Field of Search .......................... 60/330; 416/180, 416/197 C, 213 A

[56] References Cited

U.S. PATENT DOCUMENTS

| | | | |
|---|---|---|---|
| 2,115,895 | 5/1938 | Weihmann | 416/180 |
| 2,466,266 | 4/1949 | Orr | 416/180 |
| 3,166,161 | 1/1965 | Hayes | 188/90 |
| 3,873,237 | 3/1975 | Tokunaga | 416/197 C |
| 5,113,653 | 5/1992 | Sahashi | 416/197 C |
| 5,241,820 | 9/1993 | Fukunaga et al. | 60/330 |
| 5,522,220 | 6/1996 | Locker | 416/197 C |

FOREIGN PATENT DOCUMENTS

| | | |
|---|---|---|
| 0457342 | 6/1949 | Canada . |
| 1 675 260 | 12/1970 | Germany . |
| 25 01 019 | 7/1976 | Germany . |
| 28 11 171 | 9/1978 | Germany . |
| 0021566 | 2/1977 | Japan ............... 60/330 |
| 1 246 504 | 9/1971 | United Kingdom . |
| 1 485 551 | 9/1977 | United Kingdom . |

OTHER PUBLICATIONS

The Publication "The Power and Works Engineer" dated Dec. 1939.

*Primary Examiner*—Edward K. Look
*Assistant Examiner*—Mark Sgantzos
*Attorney, Agent, or Firm*—Shinjyu Office of Patent Attorneys

[57] ABSTRACT

A rotor disposed in a fluid retarder which includes a annular shell having a semicircular cross section and a plurality of blades, each blade being composed of a semicircular blade body and a rib bent from an arcuate edge of the blade body and fixed to an inside of the shell. The annular shell and the blades are composed of sheet metal. The blades are arranged at regular intervals in the circumferential direction of the shell and are welded into place. Because the annular shell and the blades are composed of sheet metal and are brazed together, the cost of manufacturing the rotor can be reduced without reducing its performance.

20 Claims, 4 Drawing Sheets

FLUID TURBINE

BACKGROUND OF THE INVENTION

1. Field of the Invention

The present invention relates a fluid turbine, and more particularly, to a fluid turbine which is used in a fluid coupling or retarder.

2. Description of the Related Art

A fluid retarder is typically used as an auxiliary brake for large vehicles such as trucks and buses. This type of retarder is mounted on the output side of a transmission and connected to the drive shaft of the vehicle. A rotor and a stator are enclosed in an operation chamber and disposed adjacent to each other. The rotor is fixed to the drive shaft and both rotate together in unison when the vehicle is in motion and the transmission is engaged. The stator is fixed to the housing and does not rotate. Both the rotor and the stator include an annular shell, and a plurality of blades are arranged radially inside the respective shells. An oil sump containing oil is disposed adjacent to the housing. When compressed air is fed to the oil sump, the oil contained in the oil sump is forced into the housing. When the rotor is rotating, the oil is displaced radially outward by centrifugal force and flows in the rotational direction of the rotor. The oil is then forced against the blades of the stator, which forces the oil to flow in a direction opposite to the rotational direction of the rotor. The oil is then directed back to the rotor. Because the oil is flowing in a direction opposite to the rotational direction of the rotor, the rotation of the rotor and the drive shaft are slowed, thereby slowing the vehicle.

Because the rotor in a fluid retarder is subjected to a high amount of torque, the rotor is typically cast from one or more metals. However, casting the rotor can result in high manufacturing costs. It is also possible to manufacture the shell and the blades from sheet metal and weld the two components together in order to reduce the cost. However unlike the rotor blades in a torque converter, the rotor blades in a retarder are not supported by a core ring. This makes it is difficult to maintain the high mechanical strength necessary for the rotor blades to withstand the high amount of torque generated within the retarder.

SUMMARY OF THE INVENTION

An object of the present invention is to allow a rotor in a fluid retarder to be produced at a low cost without reducing its mechanical strength or performance.

According to one aspect of the present invention, a retarder mechanism includes an annular shell having a semicircular shape, and a plurality of blades. Each blade includes a blade body that has a generally arcuate portion. and a generally straight portion, and a rib which extends along the length of the arcuate portion and having a first and second end. Each of the blades are arranged at regular intervals in and fixed to an inner surface of the annular shell, and the annular shell and the blades are composed of sheet metal.

According to another aspect of the present invention, a plurality of recesses are formed in the shell and a convex portion is formed on each of the ribs. The convex portions on the ribs engage with the recesses on the shell.

According to yet another aspect of the present invention, the width of each rib gradually decreases from the first end thereof to the second end thereof such that an interval between each of the ribs and the blades disposed adjacent to the ribs is substantially constant in the circumferential direction.

According to yet another aspect of the present invention, the straight portion of each blade body is beveled.

According to yet another aspect of the present invention, each blade body is inclined at a predetermined angle in the rotational direction of the shell, and the straight portion on each blade body is beveled on its trailing side with respect to the rotational direction of the shell.

According to yet another aspect of the present invention, the first and second end portions of each rib are beveled.

Other objects, features, aspects and advantages of the present invention will be apparent from the following detailed description of the present invention when taken in conjunction with the accompanying drawings, in which like reference numerals designate the same or similar parts throughout.

DETAILED DESCRIPTION OF THE PREFERRED EMBODIMENTS

Figure 1:
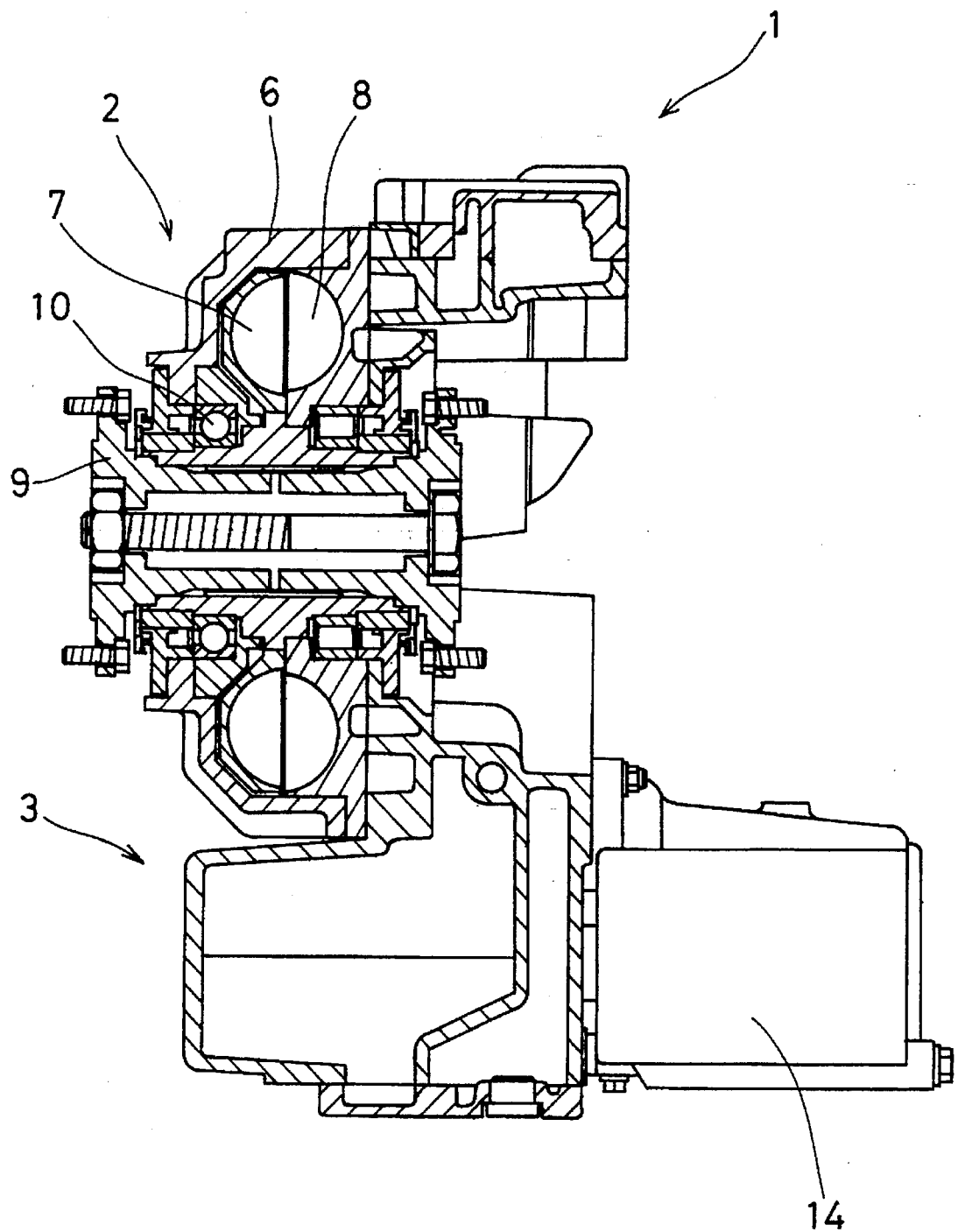
FIG. 1 is a part section, part elevation of a fluid retarder having a rotor according to one embodiment of the present invention.

As shown in FIG. 1, a retarder 1 includes an operation chamber 2 and an oil sump 3 disposed below the operation chamber 2. A rotor 7 and a stator 8 are arranged to oppose each other within a housing 6 of the operation chamber 2. The rotor 7 is fixed to a shaft 9 so as to rotate in unison. The shaft 9 is rotatably supported on the housing 6 by a bearing 10. The stator 8 is fixed to the housing 6 and does not rotate.

An oil cooler 14 is disposed on a side of the oil sump 3. The oil cooler 14 collects the oil that flows out of the operation chamber 2, and returns the oil to the oil sump 3 after it has been cooled. The oil cooler 14 cools the oil by circulating the water from the vehicle radiator within the interior of the oil cooler 14.

Figure 2:
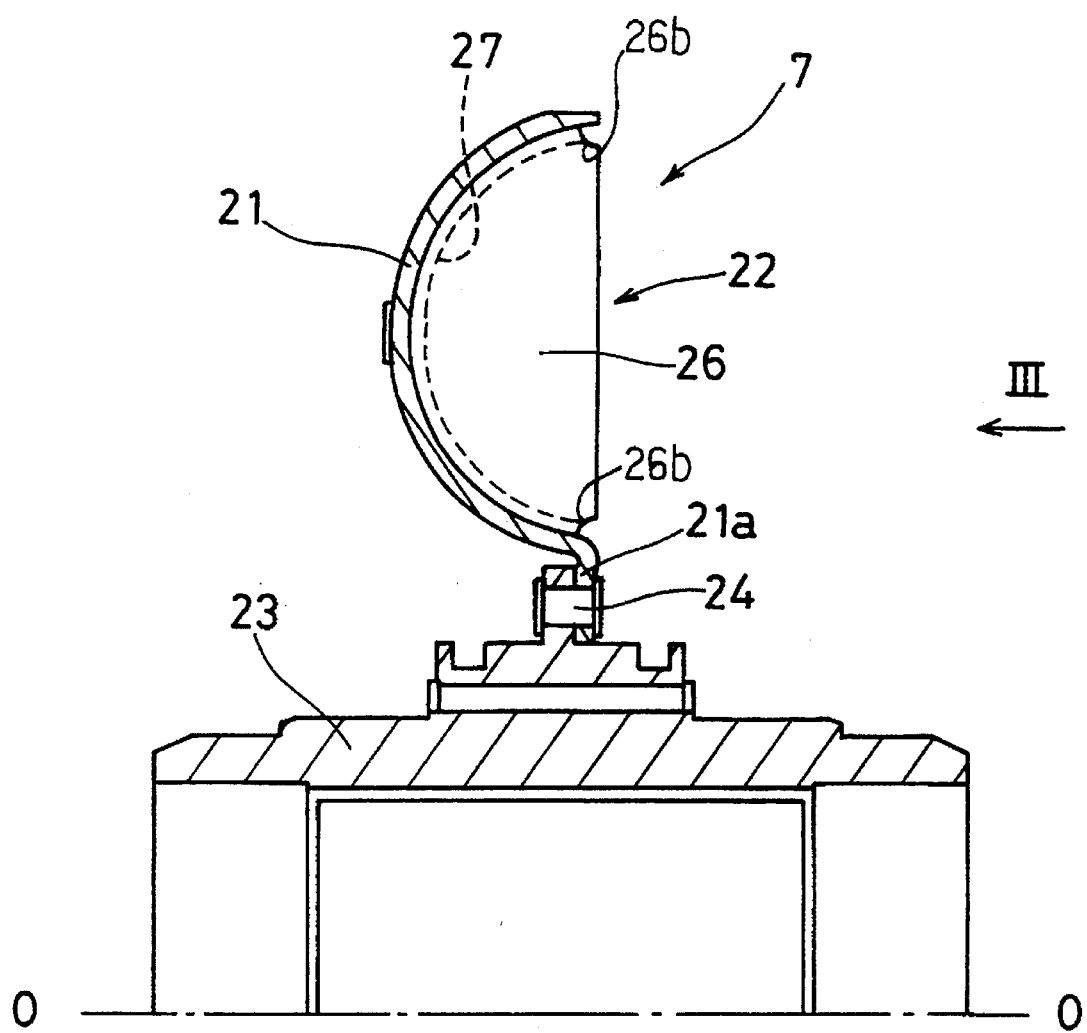
FIG. 2 is a fragmentary, part section, part elevation of a portion of the rotor depicted in FIG. 1.
Figure 3:
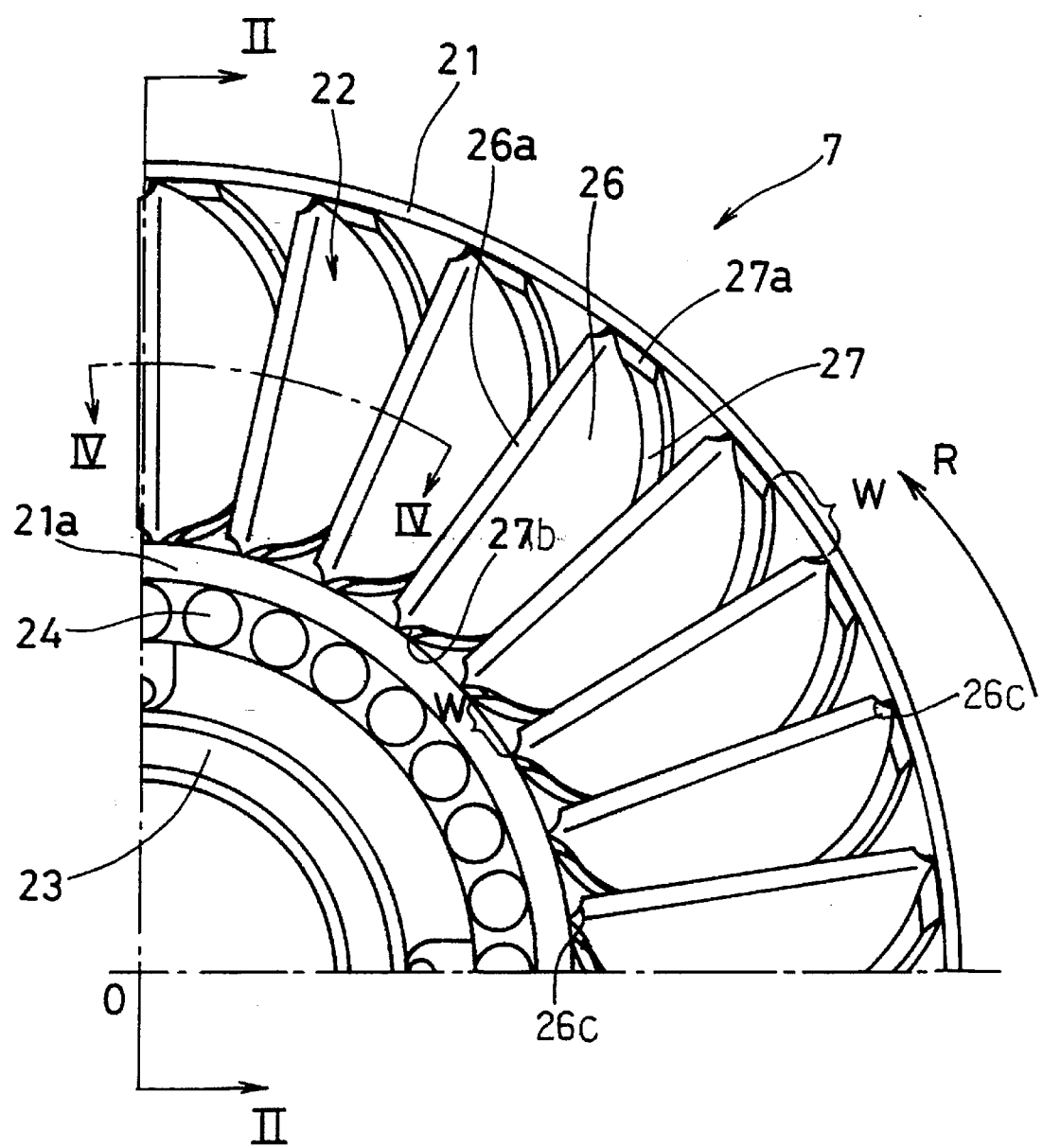
FIG. 3 is a fragmentary, perspective view of the rotor depicted in FIG. 2, taken in a direction III.
Figure 4:
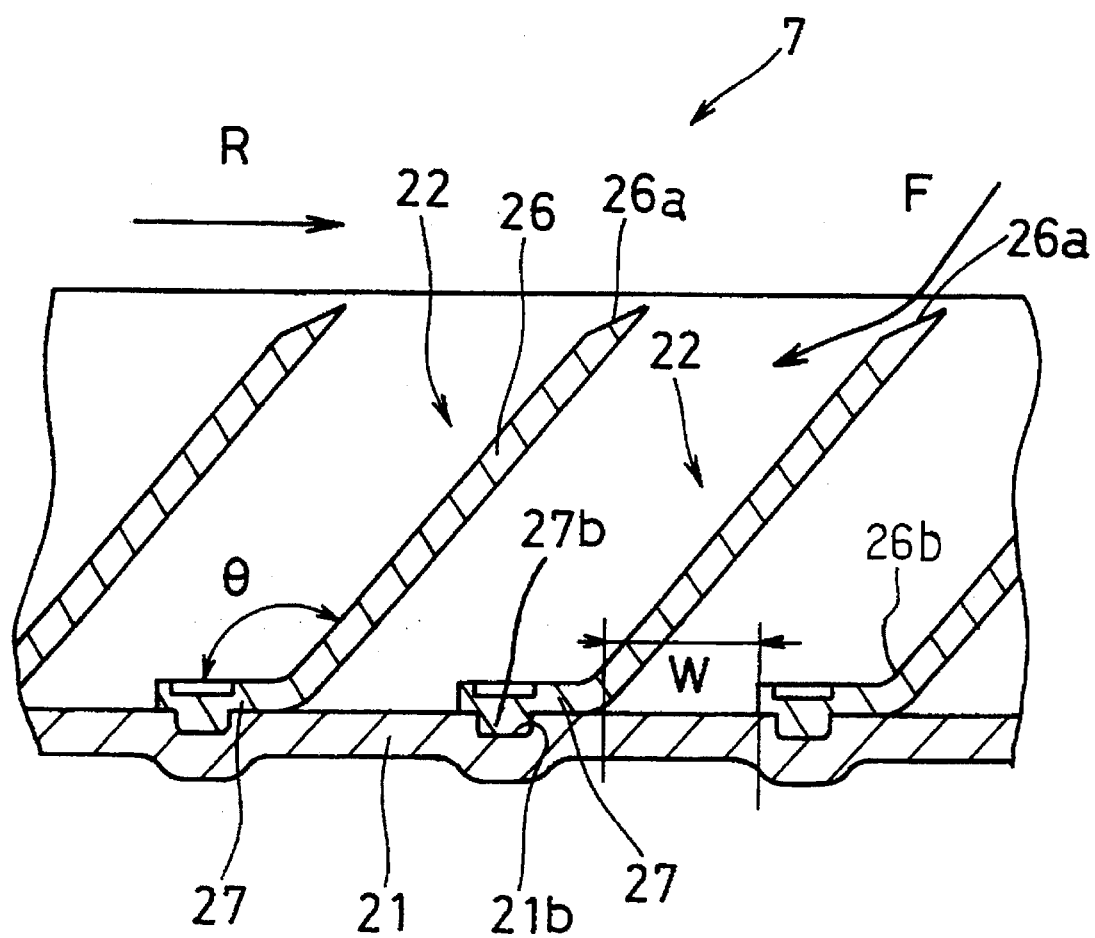
FIG. 4 is a fragmentary, part section, part elevation of the rotor depicted in FIG. 3, taken along the line IV—IV.

The rotor 7 will be explained in detail with reference to FIGS. 2 to 4. The line 0—0 in FIG. 2 represents the axis of rotation of the rotor 7 and arrow R in FIGS. 3 and 4 represents the rotational direction of the rotor 7.

The rotor 7 includes an annular sheet metal shell 21 having a generally semicircular cross section. A first flange 21a is formed on the inner circumferential side of the shell 21. The first flange 21a is fixed to a hub 23 by a plurality of rivets 24. The hub 23 is connected with the shaft 9 and does not rotate relative to the shaft 9. It is to be understood that the term sheet metal not only refers to various grades of steel, but could also refer to other types of metals having comparable characteristics. The type of metal used for the rotor 7 could also be changed in order to adjust the cost of manufacturing or the performance characteristics of the retarder 1.

A plurality of sheet metal blades 22 are arranged at regular intervals in the circumferential direction inside the shell 21. Each of the blades 22 includes of a blade body 26 which includes a generally arcuate portion 26b and a generally straight portion 26a, and a rib 27 that includes a first end portion 27a and a second end portion 27b and which extends from the arcuate portion 26b. Each blade body 26 is disposed within the shell 21 such that they are inclined in the rotational direction R of the rotor 7 at an angle θ. As is apparent from FIG. 3, the width of each rib 27 gradually decreases from the first end portion 27a to the second end portion 27b. A distance W between each rib 27 and each adjacent blade 22 is substantially uniform in the circumferential direction.

Each blade 22 is arranged so that the rib 27 is brought into contact with an inner side of the shell 21 and is brazed to the shell 21 by welding or brazing. A plurality of recesses 21b are formed on the inner circumferential side of the shell 21. A convex portion 27b is formed on each rib 27 and engages with the recesses 21b.

As is apparent from FIGS. 3 and 4, the trailing edge of each straight portion 26a with respect to the rotational direction R is beveled. In addition, first end portions 27a and second end portions 27b of each rib 27 are beveled toward the edges of the shell 21. Two cutaways 26c are formed, one cutaway 26c on each opposing side of each blade body 26 in the area where the first and second end portions 27a and 27b of each rib 27 approach the straight portion 26a of each blade body 26.

The operation of the fluid retarder will now be described.

When the transmission of the vehicle is engaged and the drive shaft is rotating, the shaft 9 and the rotor 7 rotate in unison in the direction R. Oil from the oil sump 3 is forced into the operation chamber 2 and is rotated by the rotor 7. The blades 22 of the rotor 7 cause the oil to flow over to the stator 8. The stator 8 reverses the flow direction of the oil and returns the oil to the rotor 7, thereby slowing the rotation of the rotor 7 and thus slowing the rotation of the drive shaft of the vehicle.

A high level of torque is applied to the rotor 7 when the retarder 1 is in operation. However, the blades 22 are fixed to the shell 21 by the ribs 27, thereby creating a relatively large amount of contact area between the shell 21 and the blades 22. This allows the rotor 7 to withstand the high levels of torque generated within the retarder 1 during operation, even if the components of the rotor 7 are constructed from sheet metal.

As shown in FIG. 4, the flow of oil F is stabilized when it is forced back toward the rotor 7 by the stator 8, due to the beveling on the straight portion 26a on each blade body 26 and the first and second end portions 27a and 27b on each rib 27. The flow of the oil in the radial direction is stabilized because the width W between each rib 27 and each adjacent blade 22 is kept substantially constant.

When the rotor 7 is manufactured, the blades bodies 22 are arranged in the shell 21. At this time, the convex portions 27b of the ribs 27 are engaged with the recesses 21b of the shell 21 and the ribs 27 are brazed to the shell 21 by welding or brazing. By engaging the convex portions 27b in the recesses 21b before brazing, the position and posture of the blades 26 are stabilized. As a result, the angle of inclination between blades 22 and the width W between the respective blades 22 is substantially uniform, thereby stabilizing the flow of oil within the retarder 1.

By constructing the rotor 7 from sheet metal, the cost of manufacturing may be reduced while maintaining the same level of performance of the fluid retarders found in the prior art.

Although the foregoing embodiments of the present invention relate to the rotor 7 of the retarder 1, it is possible to apply the present invention to the stator 8. Furthermore, the present invention is not limited to a retarder but may also be applied to a fluid type turbine in a fluid coupling.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A fluid turbine, comprising:
   a rotor, having an annular shell having a semicircular shape;
   a plurality of blades, wherein each blade comprises a blade body which includes a generally arcuate portion, a generally straight portion, and a rib extending along the length of said arcuate portion;
   wherein each of said blades is arranged at a regular interval with respect to adjacent ones of said blades on an inner surface of said annular shell, and said annular shell, and each of said ribs includes a first and a second end, a width of each of said ribs gradually decreasing from said first end to said second end such that between adjacent ones of said blades said regular intervals are substantially constant between adjacent of said first ends and adjacent of said second ends.

2. The fluid turbine according to claim 1, wherein said blades are formed from sheet metal.

3. The fluid turbine according to claim 1, wherein a plurality of recesses are formed in said shell and a convex portion is formed on each of said ribs, said convex portions on said ribs engaging with said recesses on said shell.

4. The fluid turbine according to claim 1, wherein said straight portion of said blade body is beveled.

5. The fluid turbine according to claim 1, wherein said blade body is inclined at a predetermined angle in a rotational direction of said annular shell, and said straight portion on said blade body is beveled on a trailing side with respect to said rotational direction of said annular shell.

6. The fluid turbine according to claim 1, wherein said first and second ends of said rib are beveled.

7. The fluid turbine according to claim 1, wherein said plurality of blades are brazed to said annular shell.

8. A fluid turbine, comprising:
   a rotor, having an annular shell having a semicircular shape;
   a plurality of blades, wherein each blade comprises a blade body which includes a generally arcuate portion, a generally straight portion, and a rib extending along the length of said arcuate portion;
   wherein each of said blades is arranged at a regular interval with respect to adjacent ones of said blades on an inner surface of said annular shell, and said annular shell and said blade body is inclined at a predetermined angle in a rotational direction of said annular shell, and said straight portion on said blade body is beveled on a trailing side with respect to said rotational direction of said annular shell.

9. The fluid turbine according to claim 8, wherein said blades are formed from sheet metal.

10. The fluid turbine according to claim 8, wherein a plurality of recesses are formed in said shell and a convex portion is formed on each of said ribs, said convex portions on said ribs engaging with said recesses on said shell.

11. The fluid turbine according to claim 8, wherein each of said ribs includes a first and a second end, a width of each of said ribs gradually decreasing from said first end to said second end such that between adjacent ones of said blades said regular intervals are substantially constant between adjacent of said first ends and adjacent of said second ends.

12. The fluid turbine according to claim 8, wherein said straight portion of said blade body is beveled.

13. The fluid turbine according to claim 11, wherein said first and second ends of said rib are beveled.

14. The fluid turbine according to claim 8, wherein said plurality of blades are brazed to said annular shell.

15. A retarder mechanism, comprising:

a housing;

an oil sump connected to said housing;

an oil cooler connected to said housing;

a shaft extending through said housing, said shaft rotatably supported in said housing by at least one bearing; and a rotor and a stator disposed in opposing relationship within said housing, said rotor connected to said shaft for rotation therewith, and said stator fixed to said housing;

wherein said rotor includes an annular shell having a semicircular shape and a plurality of blades;

each blade comprises a blade body which includes a generally arcuate portion, a generally straight portion, and a rib extending along the length of said arcuate portion;

each of said blades is arranged at a regular interval with respect to adjacent ones of said blades on an inner surface of said annular shell, a plurality of recesses are formed in said shell and a convex portion is formed on each of said ribs, said convex portions on said ribs engaging with said recesses on said shell; and each of said ribs includes a first and a second end, a width of each of said ribs gradually decreasing from said first end to said second end such that between adjacent ones of said blades said regular intervals are substantially constant between adjacent of said first ends and adjacent of said second ends.

16. The fluid turbine according to claim 15, wherein said annular shell and said blades are formed from sheet metal.

17. The retarder mechanism according to claim 15, wherein said straight portion of said blade body is beveled.

18. The retarder mechanism according to claim 17, wherein said blade body is inclined at a predetermined angle in a rotational direction of said annular shell, and said straight portion on said blade body is beveled on a trailing side with respect to said rotational direction of said annular shell.

19. The retarder mechanism according to claim 15, wherein said first and second ends of said rib are beveled.

20. The retarder mechanism according to claim 19, wherein said plurality of blades are brazed to said annular shell.

* * * * *